D. H. A. Sanders.
Cotton Seed Planter.
N° 88,670.    Patented Apr. 6, 1869.
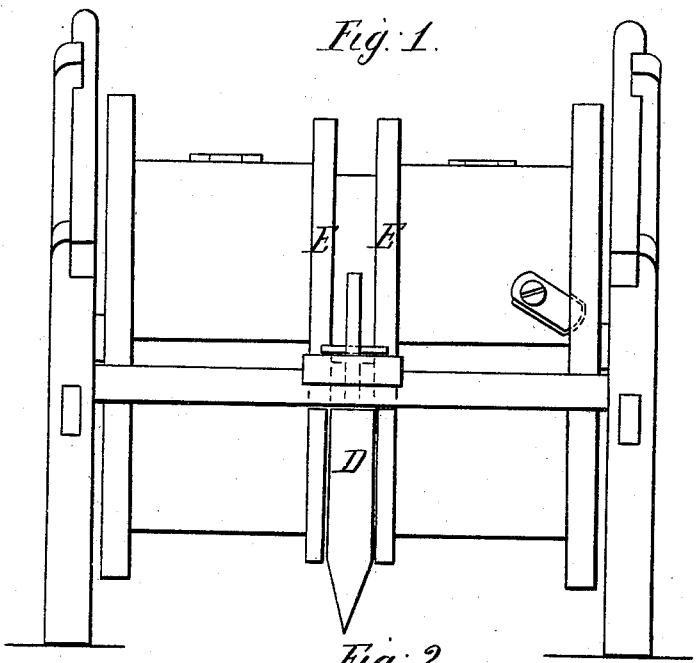
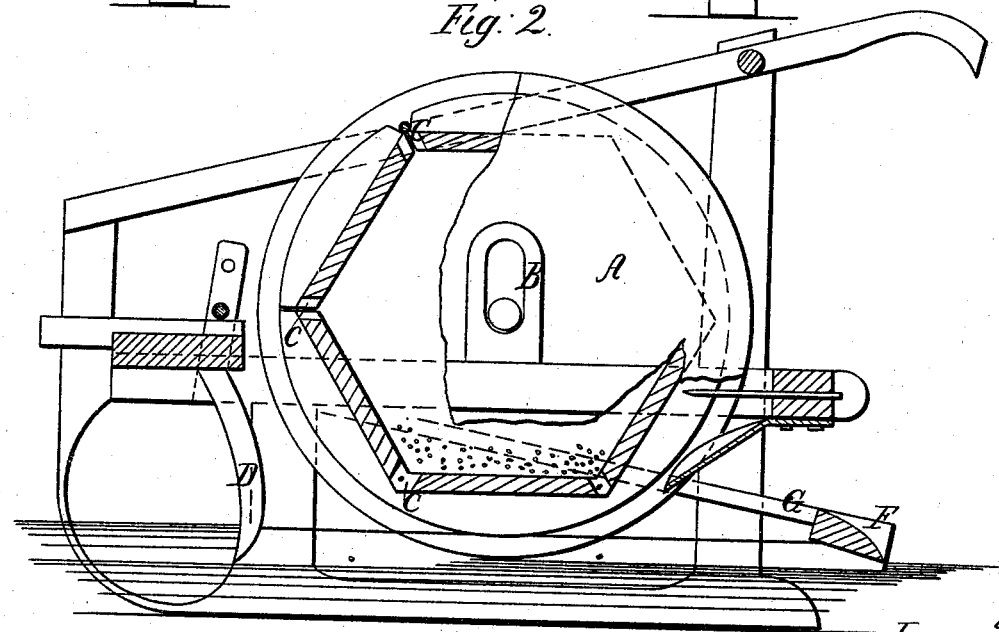
Witnesses:
Wm. A. Morgan
E. Greene Collins
Inventor:
D. H. A. Sanders
pr. Munn & Co.
Attorneys.

D. H. A. SANDERS, OF SENATOBIA, MISSISSIPPI.

Letters Patent No. 88,670, dated April 6, 1869.

IMPROVEMENT IN COTTON-SEED PLANTER.

The Schedule referred to in these Letters Patent and making part of the same

*To all whom it may concern:*

Be it known that I, D. H. A. SANDERS, of Senatobia, in the county of De Soto, and State of Mississippi, have invented a new and useful Improvement in Cotton-Seed Planters; and I do hereby declare that the following is a full, clear, and exact description thereof, which will enable others skilled in the art to make and use the same, reference being had to the accompanying drawings, forming part of this specification.

This invention relates to improvements in machines for planting cotton-seed, the object of which is to provide a machine that will perform the work in a better manner than those now in use.

It consists of a hollow hexagonal cylinder, capable of vertical play, mounted on runners, and with openings at the salient angles of the side in the centre, to deliver the seed in front, behind a grooved plow, and behind, in front of a scraping covering-device, the seed delivered in front being covered by the said cylinder.

Figure 1 represents a front elevation of my improved machine, and

Figure 2 represents a longitudinal sectional elevation of the same.

Similar letters of reference indicate like parts.

A represents a hexagonal, or other flat-sided hollow cylinder, mounted upon journals capable of vertical play in the bearings B, which is provided with openings C, behind the curved and grooved drill, or plow, D, which is, preferably, mounted in the centre of the frame transversely, which supports the cylinder on runners arranged to run below the ridges, the said openings being at the apex of the angles formed by the flat sides.

The cylinder is also provided with rims E E on each side of the openings, which are intended to roll upon the ridges formed on the top of the main ridge by the drill D, and cover the seeds delivered at the front of the cylinder into the groove of the drill, which guides them down to the bottom of the furrow.

The cylinder will also deliver seeds from the rear, and to cover this seed, I have provided the scraping-device F, which is connected to the frame by spring-supports G.

H represents a chute, to prevent the seed from falling behind the scraper F.

It will be seen from the above, that the seed first issuing from the cylinder will be laid at a greater depth than that in the rear.

Having thus described my invention,

I claim as new, and desire to secure by Letters Patent—

The cylinder A, constructed as described, having seed-discharge openings C at its angles, between the raised rims E, when mounted upon the runners and journalled in the vertical slots B, as herein described, for the purpose specified.

D. H. A. SANDERS.

Witnesses:
W. B. HOWARD,
J. A. CALDWELL.